(12) United States Patent
Hird et al.

(10) Patent No.: US 6,444,716 B1
(45) Date of Patent: **\*Sep. 3, 2002**

(54) FOAM MATERIALS AND HIGH INTERNAL PHASE EMULSIONS MADE USING OXIDATIVELY STABLE EMULSIFIERS

(75) Inventors: Bryn Hird, Cincinnati; Edward Joseph Urankar, Mason; Brian Bernard Filippini, Mentor; Richard Michael Lange, Euclid, all of OH (US); Bryan Allers Grisso, Holbrook (GB); Yan Zhao, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/978,880

(22) Filed: Oct. 16, 2001

Related U.S. Application Data (60) Continuation-in-part of application No. 09/764,562, filed on Jan. 17, 2001, now abandoned, which is a division of application No. 09/490,654, filed on Jan. 24, 2000, now Pat. No. 6,207,724.

(51) Int. Cl.$^7$ .............................. C08J 9/28; A61F 13/15
(52) U.S. Cl. ........................ 521/64; 604/358; 604/369; 521/63
(58) Field of Search ..................... 521/64, 63; 604/358, 604/369

(56) References Cited

U.S. PATENT DOCUMENTS

| | | |
|---|---|---|
| 4,839,068 A | 6/1989 | Lange |
| 5,260,345 A | 11/1993 | Des Marais et al. |
| 5,268,224 A | 12/1993 | Des Marais et al. |
| 5,331,015 A | 7/1994 | DesMarais et al. |
| 5,387,207 A | 2/1995 | Dyer et al. |
| 5,632,737 A | 5/1997 | Stone et al. |
| 5,633,291 A | 5/1997 | Dyer et al. |
| 5,753,359 A | 5/1998 | Dyer et al. |
| 5,770,634 A | 6/1998 | Dyer et al. |
| 5,786,395 A | 7/1998 | Stone et al. |
| 5,795,921 A | 8/1998 | Dyer et al. |
| 5,872,149 A | 2/1999 | Dralle-Voss et al. |
| 6,207,724 B1 | 3/2001 | Hird et al. |

FOREIGN PATENT DOCUMENTS

| | | |
|---|---|---|
| WO | WO 97/37745 A1 | 10/1997 |
| WO | WO 01/52976 A2 | 7/2001 |

OTHER PUBLICATIONS

Z. Bhumgara, "Polyhipe Foam Materials as Filtration Media," *Filtration & Separation*, Mar. 1995, pp. 245–251.

D. C. Walsh et al., "PolyHIPE Foams: Production, Characterisations, and Performance as Aerosol Filtration Materials," *J. Aerosol Sci.* 1996, vol. 27, pp. 5629–5630.

S. Ganguly et al., "Surfactant–electrolyte interactions in concentrated water–in–oil emulsions: FT–IR spectroscopic and low–temperature differential scanning calorimetric studies," *Colloids and Surfaces*, 65 (1992) pp. 243–256.

*Primary Examiner*—Morton Foelak
(74) *Attorney, Agent, or Firm*—Angela Marie Stone; Edward J. Milbrada (57) ABSTRACT

This application relates to microporous, open-celled polymeric foam materials with physical characteristics that make them suitable for a variety of uses produced from high internal phase emulsions (HIPEs). This application particularly relates to oxidatively stable emulsifiers used to stabilize the HIPE and the foams produced from such HIPEs.

16 Claims, 1 Drawing Sheet

FOAM MATERIALS AND HIGH INTERNAL PHASE EMULSIONS MADE USING OXIDATIVELY STABLE EMULSIFIERS

CROSS REFERENCE TO RELATED APPLICATION

This application is a continuation-in-part of and claims priority to U.S. application Ser. No. 09/764,562, filed Jan. 17, 2001, now abandoned; which is a divisional of and claims priority to U.S. application Ser. No. 09/490,654, filed Jan. 24, 2000, now U.S. Pat. No. 6,207,724.

FIELD OF THE INVENTION

This application relates to microporous, open-celled polymeric foam materials produced from high internal phase emulsions (HIPEs). This application particularly relates to oxidatively stable emulsifiers used to stabilize the HIPE, and to the foams produced from HIPEs stabilized with such emulsifiers. The physical characteristics of such HIPE foams make them suitable for a variety of uses.

BACKGROUND OF THE INVENTION

The development of microporous foams is the subject of substantial commercial interest. Such foams have found utility in various applications such as thermal, acoustic, electrical, and mechanical insulators; absorbent materials; filters; membranes; floor mats; toys; carriers for inks, dyes, lubricants, or lotions; and the like. References describing such uses and properties of foams include Oertel, G., *Polyurethane Handbook*, Hanser Publishers, Munich, 1985; and Gibson, L. J., Ashby, M. F., *Cellular Solids. Structure and Properties*, Pergamon Press, Oxford, 1988. The term "insulator" refers to any material which reduces the transfer of energy from one location to another. The term "absorbent" refers to materials which imbibe and hold or distribute fluids, usually liquids, an example being a sponge. The term "filter" refers to materials which pass a fluid, either gas or liquid, while retaining particulate matter suspended in the fluid by size exclusion or other means. Other uses for foams are generally obvious to one skilled in the art.

Open-celled foams prepared from High Internal Phase Emulsions (hereinafter referred to as "HIPEs") are particularly useful in a variety of applications including:

- absorbent disposable articles: U.S. Pat. No. 5,331,015 (DesMarais et al.) issued Jul. 19, 1994; U.S. Pat. No. 5,260,345 (DesMarais et al.) issued Nov. 9, 1993; U.S. Pat. No. 5,268,224 (DesMarais et al.) issued Dec. 7, 1993; U.S. Pat. No. 5,632,737 (Stone et al.) issued May 27, 1997; U.S. Pat. No. 5,387,207 (Dyer et al.) issued Feb. 7, 1995; U.S. Pat. No. 5,786,395 (Stone et al.) Jul. 28, 1998; and U.S. Pat. No. 5,795,921 (Dyer et al.) issued Aug. 18, 1998;
- insulation e. g. (thermal, acoustic, mechanical): U.S. Pat. No. 5,770,634 (Dyer et al.) issued Jun. 23, 1998; U.S. Pat. No. 5,753,359 (Dyer et al.) issued May 19, 1998; and U.S. Pat. No. 5,633,291 (Dyer et al.) issued May 27, 1997;
- filtration: Bhumgara, Z. *Filtration & Separation March,* 1995, 245–251, Walsh et al. *J. Aerosol Sci.* 1996, 27, 5629–5630; and in published PCT application W/O 97/37745, published on Oct. 16, 1997, in the name of Shell Oil Co.; and various other uses.

The cited patents and references above are incorporated herein by reference. The HIPE process provides facile control over the density, cell and pore size and distribution, proportion of cell struts to windows, and porosity in these foams.

The physical properties of the foam are governed by: (1) the properties of the polymer from which the foam is comprised, (2) the density of the foam, (3) the structure of the foam (i.e. the thickness, shape and aspect ratio of the polymer struts, cell size, pore size, pore size distribution, etc.), and (4) the surface properties of the foam (e.g., whether the surface of the foam is hydrophilic or hydrophobic). The emulsifier used to stabilize the HIPE can have a profound influence on such properties.

Without being bound by theory, a number of factors are believed to be important in determining the suitability of an emulsifier for producing HIPE foams with desirable physical characteristics.

- A relatively high molecular weight of the emulsifier hydrophobe is typically required in order to stabilize water-in-oil emulsions with the desired droplet size at very high internal phase ratios and at the temperatures required to effect cure of the polymer comprising the HIPE foam.
- The melting point of the emulsifier should be below the in-use temperature of the HIPE foam where the foam is intended for use in applications involving the rapid absorption of aqueous fluids. Emulsifiers with higher melting points that are suitable for the formation of high internal phase water-in-oil emulsions tend to be waxy in nature and do not typically produce foams which imbibe aqueous fluids rapidly.
- The emulsifier should not excessively plasticize the polymer comprising the HIPE foam. Typically, emulsifiers comprising highly branched hydrophobes tend to produce HIPE foams with relatively low resistance to compressive deformation. This is believed to be due to plasticization of the polymer by the branched hydrophobe and is particularly evident in low density HIPE foams that were formed from high water to oil ratio HIPEs.
- The emulsifier should be chemically stable during the storage and use of the HIPE foam prepared using such emulsifier. Any emulsifier remaining in the foam should not undergo any undesirable reactions or yield any undesirable chemical species. Emulsifiers with unsaturated hydrocarbon hydrophobes tend to be oxidatively unstable under normal storage conditions and can give rise to relatively low molecular weight aldehydes with characteristic unpleasant odor. The rate of oxidation and odor formation is exacerbated because the emulsifier is effectively spread over the high surface area of the HIPE foam. Exposure to high temperatures and/or ultraviolet light further accelerates oxidation.

In addition to the above criteria, the emulsifier should be relatively easy to produce in commercial quantities at a reasonable cost, and it should be safe for use in the intended application of the HIPE foam.

Various sorbitan esters and polyglycerol fatty esters have been used as emulsifiers for HIPE emulsions in absorbent foam applications, as exemplified in the aforementioned U.S. Pat. No. 5,387,207. This patent teaches the use of a commercial sorbitan ester which is a complex blend of surface active components, at least a portion of which comprises sorbitan monolaurate, along with diesters, higher molecular weight hydrophobes, isosorbide esters, and the like. While sorbitan monolaurate can be used to produce HIPEs and foams having desirable properties, such foams are limited to relatively high densities because of the low internal phase ratios achievable with this emulsifier. Sorbitan monolaurate is also typically limited to producing foams with relatively small average cell size. The non-sorbitanmonolaurate components further limit the internal phase ratios that are achievable. It will be recognized that commercial quantities of substantially pure sorbitan monoesters would be significantly more difficult to produce than the commercially available blend of materials and would thus be more expensive. Similarly, polyglycerol esters are also relatively difficult to produce in a substantially pure form. Without being bound by theory, it is believed that the molecular weight of the monolaurate hydrocarbon hydrophobe is too low to stabilize high internal phase water-in-oil emulsions with relatively large droplets of the discontinuous aqueous phase at the W:O ratios and temperatures required to cure the continuous external monomeric oil phase at a commercially satisfactory rate. In order to prepare foams with lower density and/or larger average cell size, the hydrocarbon hydrophobe should preferably have (on average) more than 14 carbon atoms, and more preferably more than 16 carbon atoms, while retaining a relatively low melting point for hydrophilicity, as described above.

Emulsifiers comprising saturated linear hydrocarbon hydrophobes with relatively high molecular weight, such as sorbitan monostearate or diglycerol monostearate may be used to produce HIPE foams with desirable cell sizes and with relatively high resistance to compression. However, owing to the relatively high melting points of these emulsifiers, such foams do not typically imbibe aqueous fluids rapidly under normal in-use temperatures (e.g. ambient and/or body temperatures).

One method of achieving a hydrocarbon hydrophobe with both relatively high molecular weight and relatively low melting point is to incorporate one or more cis C=C double bonds into the hydrocarbon chain. An example of a prior art emulsifier which functions very well in providing foams having desirable properties is diglycerol monooleate as discussed in commonly assigned U.S. Pat. No. 5,786,395 (Stone et al.) issued Jul. 28, 1998 the disclosure of which is incorporated herein by reference. Foams with desired average cell sizes and densities can be prepared using diglycerol monooleate. Such foams typically have good mechanical properties and can imbibe aqueous fluids rapidly under typical in-use conditions. However, this emulsifier is oxidatively unstable due to unsaturation in the oleate hydrophobe. This leads to malodor formation over time, as described above.

Another method of achieving a hydrocarbon hydrophobe with both relatively high molecular weight and relatively low melting point is to incorporate branching into the hydrocarbon moiety. The aforementioned U.S. Pat. No. 5,786,395 discusses the suitability of branched fatty hydrophobes. Although emulsifiers comprising such branched hydrophobes have been found to provide foams having desirable properties at relatively high densities, low density foams prepared with such emulsifiers (i.e. those prepared from water-in-oil emulsions with very high internal phase ratios) tend to have relatively low resistance to compressive deformation. Without being bound by theory, it is believed that such branched hydrophobes tend to plasticize the polymer comprising the foam excessively, thereby weakening the foam structure.

As can be seen the emulsifiers used by the art to stabilize HIPEs in the manufacture of HIPE-based foams all have properties that make them less than desirable.

Accordingly, it would be desirable to develop emulsifier materials suitable for stabilizing HIPEs, such that the foams produced from these HIPEs have all of the desirable properties of HIPE foams, including the desired density; structure (e.g. cell size and cell size distribution); mechanical properties (e.g. resistance to compressive deformation); fluid handling properties (e.g. rapid uptake of aqueous fluids); and chemical stability (e.g. resistance to degradation and/or odor formation). It would be still more desirable if such emulsifiers could provide such desirable properties at an economical cost.

SUMMARY OF THE INVENTION

The present invention relates to open-celled foams that are produced by polymerizing a High Internal Phase Emulsion, or HIPE, which has a relatively small amount of a continuous oil phase and a relatively greater amount of a discontinuous aqueous phase. The present invention particularly relates to oxidatively stable emulsifiers that are useful in stabilizing the HIPE and to HIPEs and HIPE foams produced using such HIPEs.

The oxidatively stable emulsifiers of the present invention comprise a composition made by reacting a hydrocarbyl substituted succinic acid or anhydride or a reactive equivalent thereof with either a polyol (or blend of polyols), a polyamine (or blend of polyamines) an alkanolamine (or blend of alkanol amines), or a blend of two or more polyols, polyamines and alkanolamines.

DETAILED DESCRIPTION OF THE INVENTION

I. Definitions

The following definitions are offered relative to the current invention.

"Water to oil ratio" or "W:O ratio" is the ratio of the discontinuous internal aqueous phase or water phase to the external continuous oil phase in a high internal phase water-in-oil emulsion. The aqueous phase can include not only water but also water soluble components such as electrolytes and polymerization initiators. For purposes of the present invention W:O ratio is calculated as the ratio of the volume of the aqueous phase expressed in milliliters to the weight of the oil phase expressed in grams.

"Curing" is the process of converting a HIPE to a HIPE foam. Curing involves the polymerization of monomers into polymers. A further step included in the curing process is crosslinking. A cured HIPE foam is one which has the physical properties, e.g., mechanical integrity, to be handled in subsequent processing steps (which may include a post-curing treatment to confer such final properties as may be desired). Generally, curing is effected via the application of heat.

"Polymerization" is the part of the curing process whereby the monomers of the oil phase are converted to a relatively high molecular weight polymer.

"Crosslinking" is the part of the curing process whereby the monomers having more than one functional group with respect to free radical polymerization are copolymerized into more than one chain of the growing polymer.

As used herein, the term "hydrocarbyl substituent" or "hydrocarbyl group" is used in its ordinary sense, which is well-known to those skilled in the art. Specifically it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

(2) substituted hydrocarbon substituents, that is, substituents containing non- hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The term "reactive equivalent" of a material means any compound or chemical composition other than the material itself that reacts or behaves like the material itself under the reaction conditions. Thus for example, reactive equivalents of carboxylic acids include acid-producing derivatives such as anhydrides, acyl halides, and mixtures thereof unless specifically stated otherwise.

All percentages, ratios, and proportions used herein are by weight unless otherwise specified.

II. Polymeric Foam Derived From a High Internal Phase Emulsion (HIPE)

A. General HIPE Characteristics

1. Oil Phase Components

The continuous oil phase of the HIPE comprises monomers that are polymerized to form the solid foam structure and the emulsifier necessary to stabilize the emulsion. In general, the monomers will include from about 20 to about 95% by weight of at least one substantially water-insoluble monofunctional monomer capable of forming an atactic amorphous polymer having a glass transition temperature (Tg) of about 35° C. or lower. This comonomer is added to lower the overall Tg of the resulting HIPE foam. Exemplary monomers of this type include $C_4$–$C_{14}$ alkyl acrylates and $C_6$–$C_{16}$ methacrylates such as 2-ethylhexyl acrylate, n-butyl acrylate, hexyl acrylate, n-octyl acrylate, nonyl acrylate, decyl acrylate, isodecyl acrylate, tetradecyl acrylate, benzyl acrylate, nonyl phenyl acrylate, hexyl methacrylate, octyl methacrylate, nonyl methacrylate, decyl methacrylate, isodecyl methacrylate, dodecyl methacrylate, and tetradecyl methacrylate; substituted acrylamides, such as N-octadecyl acrylamide; dienes such as isoprene, butadiene, chloroprene, piperylene, 1,3,7-octatriene, β-myrcene and amyl butadiene; substituted $C_4$–$C_{12}$ styrenics such as p-n-octyl styrene; and combinations of such monomers. The Tg lowering monofunctional monomers will generally comprise 20% to about 95%, more preferably 45% to about 65%, by weight of the monomer component.

The oil phase will also comprise from about 5 to about 80% by weight of a substantially water-insoluble, polyfunctional crosslinking agent. This comonomer is added to confer strength to the resulting HIPE foam. Exemplary crosslinking monomers of this type encompass a wide variety of monomers containing two or more activated vinyl groups, such as the divinyl benzenes and analogs thereof. These analogs include m,p-divinyl benzene mixtures with ethyl styrene, divinyl naphthalene, trivinyl benzene, divinyl alkyl benzenes, divinyl biphenyls, divinyl phenyl ethers, divinyl ferrocenes, divinyl furans, and the like. Other useful crosslinking agents may be selected from a group derived from the reaction of acrylic acid or methacrylic acid with polyfunctional alcohols and amines. Nonlimiting examples of this group include 1,6-hexanedioldiacrylate, 1,4-butanedioldimethacrylate, trimethylolpropane triacrylate, hexamethylene bisacrylamide, and the like. Other examples of crosslinking monomers include divinyl sulfide, divinyl sulfone, and trivinyl phosphine. Other crosslinkers useful in this regard are well known to those skilled in the art. It should be noted that the weight fraction of the crosslinking component is calculated on the basis of the pure crosslinker in cases wherein the crosslinking monomer is commonly used as a mixture (e.g., divinyl benzene often is a 55% pure mixture with the balance being ethyl styrene).

Any third substantially water-insoluble comonomer may be added to the oil phase in weight percentages of from about 0% to about 70%, preferably from about 15% to about 40%, to modify properties in other ways. In certain cases, "toughening" monomers may be desired which impart toughness to the resulting HIPE foam equivalent to that provided by styrene. These include styrenics, such as styrene and ethyl styrene, and methyl methacrylate. Also included are styrenics and other compounds which may also help reduce the Tg or enhance the strength of the resulting HIPE foam such as p-n-octyl styrene. Monomers may be added to confer flame retardancy as disclosed in commonly assigned U.S. Pat. No. 6,160,028 (Dyer) published on Dec. 12, 2000. Monomers may be added to confer color, fluorescent properties, radiation resistance, opacity to radiation (e.g., lead tetraacrylate), to disperse charge, to reflect incident infrared light, to absorb radio waves, to form a wettable surface on the HIPE foam struts, or for any other purpose. Other additives, such as fillers, flame retardants, or other materials as may be desired, can also be added to the HIPE prior to curing.

2. Aqueous Phase Components

The discontinuous aqueous internal phase of the HIPE is generally an aqueous solution containing one or more dissolved components. One essential dissolved component of the aqueous phase is a water-soluble electrolyte. The dissolved electrolyte minimizes the tendency of monomers, comonomers, and crosslinkers that are primarily oil soluble to also dissolve in the aqueous phase.

Any electrolyte capable of imparting ionic strength to the water phase can be used. Preferred electrolytes are mono-, di-, or trivalent inorganic salts, such as the water-soluble halides (e.g. chlorides), nitrates, and sulfates of alkali metals and alkaline earth metals. Examples include sodium chloride, calcium chloride, sodium sulfate, and magnesium sulfate. For HIPEs that are used to make polymeric foams, calcium chloride is most preferred. Generally, the electrolyte will be utilized in the water phase of the HIPE in a concentration in the range of from about 0.2% to about 40% by weight of the water phase. Preferably, the concentration is between 1% and about 20% by weight of the water phase. More preferably, between about 1% and about 10%.

Another component of the aqueous phase is a water-soluble free-radical initiator as may be known to the art. The initiator can be present at up to about 20 mole percent based on the total moles of polymerizable monomers present in the oil phase. More preferably, the initiator is present in an amount of from about 0.001 to about 10 mole percent based on the total moles of polymerizable monomers in the oil phase. Suitable initiators include ammonium persulfate and potassium persulfate.

3. Emulsifier

The emulsifier is necessary for forming and stabilizing the HIPE. The emulsifier is generally included in the oil phase and tends to be relatively hydrophobic in character. (See for example Williams, J. M., *Langmuir* 1991, 7, 1370–1377, incorporated herein by reference.) Such emulsifiers are advantageously added to the oil phase so that the oil phase comprises between about 1% and about 20% emulsifier. Obviously, emulsifiers that are particularly able to stabilize fHPEs at high temperatures are preferred. The following discusses the particularly preferred, oxidatively stable emulsifier compositions of the present invention.

Preferred emulsifiers according to the present invention are the alkenyl succinate derivative emulsifiers (ASDs) which are made by reacting (A) a hydrocarbyl substituted succinic acid or anhydride or a reactive equivalent thereof with a coreactant (B) selected from the group consisting of polyols, polyamines, hydroxyamines or mixtures of two or more thereof to form an intermediate reaction product and partially dehydrating the intermediate reaction product to form the emulsifier.

3.1 Hydrocarbyl Substituted Succinic Acid/Anhydride

The hydrocarbyl substituted succinic acid or anhydride (A) may be represented by the formulae wherein in each of the above formulae, R is a hydrocarbyl group of about 12 to about 200 carbon atoms, and in one embodiment about 12 to about 150 carbon atoms, and in one embodiment about 12 to about 100 carbon atoms, and in one embodiment about 12 to about 75 carbon atoms, and in one embodiment about 12 to about 50 carbon atoms, and in one embodiment about 18 to about 30 carbon atoms. In one embodiment, R is an alkyl or an alkenyl group.

In one embodiment, a mixture of at least two hydrocarbyl substituted succinic acids or anhydrides is used. The hydrocarbyl substituent of one of the acids or anhydrides has an average of about 12 to about 24 carbon atoms, and in one embodiment about 14 to about 18 carbon atoms, and in one embodiment at 16 carbon atoms. The hydrocarbyl substituent of the other acid or anhydride has an average of about 60 to about 200 carbon atoms, and in one embodiment about 60 to about 150 carbon atoms, and in one embodiment about 60 to about 100 carbon atoms, and in one embodiment about 60 to about 75 carbon atoms.

The hydrocarbyl group R in the above formulae may be derived from an alpha-olefin or an alpha-olefin fraction. The alpha-olefins include 1-dodecene, 1-tridecene, 1-tetradecene, 1-pentadecene, 1-hexadecene, 1-heptadecene, 1-octadecene, 1-eicosene, 1-docosene, 1-triacontene, and the like. The alpha olefin fractions that are useful include $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{18-24}$ alpha-olefins, $C_{18-30}$ alpha-olefins, and the like. Mixtures of two or more of any of the foregoing alpha-olefins or alpha-olefin fractions may be used.

In one embodiment, R in the above formulae is a hydrocarbyl group derived from an olefin oligomer or polymer. The olefin oligomer or polymer may be derived from an olefin monomer of 2 to about 10 carbon atoms, and in one embodiment about 3 to about 6 carbon atoms, and in one embodiment about 4 carbon atoms. Examples of the monomers include ethylene; propylene; butene-1; butene-2; isobutene; pentene-1; heptene-1; octene-1; nonene-1; decene-1; pentene-2; or a mixture of two of more thereof.

In one embodiment, R in the above formulae is a polyisobutene group. The polyisobutene group may be made by the polymerization of a $C_4$ refinery stream having a butene content of about 35 to about 75% by weight and an isobutene content of about 30 to about 60% by weight.

In one embodiment, R in the above formulae is a polyisobutene group derived from a polyisobutene having a high methylvinylidene isomer content, that is, at least about 50% and in one embodiment at least about 70% methylvinylidenes. Suitable high methylvinylidene polyisobutenes include those prepared using boron trifluoride catalysts. The preparation of such polyisobutenes in which the methylvinylidene isomer comprises a high percentage of the total olefin composition is described in U.S. Pat Nos. 4,152,499 and 4,605,808, the disclosure of each of which are incorporated herein by reference.

In one embodiment, the hydrocarbyl-substituted succinic acid or anhydride (A) consists of hydrocarbyl substituent groups and succinic groups. The hydrocarbyl substituent groups are derived from an olefin polymer as discussed above and, in one embodiment, have a number average molecular weight in the range of about 750 to about 3000, and in one embodiment about 900 to about 2000. The hydrocarbyl substituted succinic acid or anhydride is characterized by the presence within its structure of an average of at least about 1.3 succinic groups, and in one embodiment from about 1.5 to about 2.5, and in one embodiment form about 1.7 to about 2.1 succinic groups for each equivalent weight of the hydrocarbyl substituent.

For purposes of this invention, the equivalent weight of the hydrocarbyl substituent group of the hydrocarbyl-substituted succinic acid or anhydride is deemed to be the number obtained by dividing the number average molecular weight ($M_n$) of the polyolefin from which the hydrocarbyl substituent is derived into the total weight of all the hydrocarbyl substituent groups present in the hydrocarbyl-substituted succinic acid or anhydride. Thus, if a hydrocarbyl-substituted acylating agent is characterized by a total weight of all hydrocarbyl substituents of 40,000 and the $M_n$ value for the polyolefin from which the hydrocarbyl substituent groups are derived is 2000, then that substituted succinic acid or anhydride is characterized by a total of 20 (40,000/2000=20) equivalent weights of substituent groups.

The ratio of succinic groups to equivalent of substituent groups present in the hydrocarbyl-substituted succinic acid or anhydride (also called the "succination ratio") may be determined by one skilled in the art using conventional techniques (such as from saponification or acid numbers). For example, the formula below can be used to calculate the succination ratio where maleic anhydride is used.

$$SR = \frac{M_n \times (\text{Sap. No. of acylating agent})}{(56100 \times 2) - (98 \times \text{Sap. No. of acylating agent})}$$

In this equation, SR is the succination ratio, $M_n$ is the number average molecular weight, and Sap. No. is the saponification number. In the above equation, Sap. No. of acylating agent=measured Sap. No. of the final reaction mixture/AI wherein AI is the active ingredient content expressed as a number between 0 and 1, but not equal to zero. Thus an active ingredient content of 80% corresponds to an AI value of 0.8. The AI value can be calculated by using techniques such as column chromatography which can be used to determine the amount of unreacted polyalkene in the final reaction mixture. As a rough approximation, the value of AI is determined after subtracting the percentage of unreacted polyalkene from 100.

The acid number of the reaction product is a measure of the partial condensation reaction of the carboxylic acid groups. Suitably, the acid number of a reaction product according to the present invention is between about 10 and about 100 mg of KOH/g. Preferably, the acid number is from about 12 and about 60. Depending upon the reaction product chosen, the preferred acid number is from about 40 to about 65 or from about 10 to about 30. A method for measuring acid number is provided in the TEST METHODS section.

3.2 Co-Reactant (B)

In one embodiment, (B) is a polyol. For example, the polyol can be a compound represented by the formula wherein in the foregoing formula, R is an organic group having a valency of m, R is joined to the OH groups through carbon-to-oxygen bonds, and m is an integer from 2 to about 10, and in one embodiment 2 to about 6. The polyol may be a glycol, a polyoxyalkylene glycol, a carbohydrate, or a partially esterified polyhydric alcohol. Examples of the polyols that may be used include ethylene glycol, diethylene glycol, triethylene glycol, tetraethylene glycol, propylene glycol, dipropylene glycol, tripropylene glycol, dibutylene glycol, tributylene glycol, 1,2-butanediol, 2,3-dimethyl-2,3-butanediol, 2,3-hexanediol, 1,2-cyclohexanediol, pentaerythritol, dipentaerythritol, 1,7-heptanediol, 2,4-heptanediol, glycerol, 1,2,3-hexanetriol, 1,2,4-hexanetriol, 1,2,5-hexanetriol, 2,3,4-hexanetriol, 1,2,3-butanetriol, 1,2,4-butanetriol, 2,2,6,6-tetrakis-(hydroxymethyl) cyclohexanol, 1,10-decanediol, digitalose, 2-hydroxymethyl-2-methyl-1,3-propanediol-(tri-methylolethane), or 2-hydroxymethyl-2-ethyl-1,3-propanediol-(trimethylopropane), and the like. Mixtures of two or more polyols can be used.

In one embodiment, the polyol is a sugar, starch or mixture thereof. Examples of these include erythritol, threitol, adonitol, arabitol, xylitol, sorbitol, mannitol, erythrose, fucose, ribose, xylulose, arabinose, xylose, glycose, fructose, sorbose, mannose, sorbitan, glucosamine, sucrose, rhamnose, glyceraldehyde, galactose, and the like. Mixtures of two or more polyols can be used. In one embodiment, the polyol is an oligomer or mixture of oligomers of glycerol. The number of glycerol units in the oligomers ranges from about 1 to about 15. Oligomers include glycerol, diglycerol, trigolycerol, polyglycerol, and mixtures thereof. The oligomers of glycerol can be branched, linear, cyclic, or mixtures thereof. Preferably, a mixture of glycerol and polyglycerol is used as the polyol.

In one embodiment, the polyol is a polyhydric alcohol having at least three hydroxyl groups, wherein some of the hydroxyl groups are esterified with an aliphatic monocarboxylic acid of about 8 to about 30 carbon atoms, but at least two of the hydroxyl groups are not esterified. Examples include monooleate of glycerol, monostearate of glycerol, monooleate of sorbitol, distearate of sorbitol, di-dodecanoate of erythritol, the like. Mixtures of two or more polyols can be used.

In another embodiment (B) is a polyamine. Suitable polyamines may be aliphatic, cycloaliphatic, heterocyclic or aromatic compounds. Examples include alkylene polyamines and heterocyclic polyamines. The alkylene polyamines may be represented by the formula wherein n has an average value between 1 and about 10, and in one embodiment about 2 to about 7, the "Alkylene" group has from 1 to about 10 carbon atoms, and in one embodiment about 2 to about 6 carbon atoms, and each R is independently hydrogen or an aliphatic or hydroxy-substituted aliphatic group of up to about 30 carbon atoms. These alkylene polyamines include ethylene polyamines, butylene polyamines, propylene polyamines, pentylene polyamines, etc. The higher homologs and related heterocyclic amines such as piperazines and N-amino alkyl-substituted piperazines are also included. Specific examples of such polyamines include ethylene diamine, triethylene tetramine, tris-(2-amino ethyl)amine, propylene diamine, trimethylene diamine, tripropylene tetramine, tetraethylene pentamine, hexaethylene heptamine, pentaethylene hexamine, or a mixture of two or more thereof.

Ethylene polyamines, such as some of those mentioned above, are useful. Such polyamines are described in detail under the heading Ethylene Amines in Kirk Othmer's "Encyclopedia of Chemical Technology", 2nd Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as piperazines. Ethylene polyamine mixtures are useful.

The polyamine may also be a heterocyclic polyamine. Among the heterocyclic polyamines are aziridines, azetidines, azolidines, tetra- and dihydropyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above and mixtures of two or more of these heterocyclic amines. Useful heterocyclic amines are the saturated 5 and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are useful. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine.

In yet another embodiment (B) is a hydroxyamine. The hydroxyamine may be a primary, secondary or tertiary amine. The terms "hydroxyamine" and "aminoalcohol" describe the same class of compounds and, therefore, can be used interchangeably. In one embodiment, the hydroxyamine is (a) an N-(hydroxyl-substituted hydrocarbyl) amine, (b) a hydroxyl-substituted poly (hydrocarbyloxy) analog of (a), or a mixture of (a) and (b). The hydroxyamine may be alkanolamine containing from 1 to about 40 carbon atoms, and in one embodiment 1 to about 20 carbon atoms, and in one embodiment 1 to about 10 carbon atoms.

The hydroxyamine may be a primary, secondary or tertiary alkanolamine, or a mixture of two or more thereof. These hydroxyamines may be represented, respectively, by the formulae:

wherein each R is independently a hydrocarbyl group of one to about eight carbon atoms or hydroxyl-substituted hydrocarbyl group of two to about eight carbon atoms and R' is a divalent hydrocarbon group of about two to about 18 carbon atoms. Typically each R is a lower alkyl group of up to seven carbon atoms. The group —R'—OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group.

Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like.

The hydroxyamines may be ether N-(hydroxy-substituted hydrocarbyl)amines. These may be hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines may be conveniently prepared by reaction of epoxides with aforementioned amines and may be represented by the formulae:

wherein x is a number from about 2 to about 15, and R and R' are as described above.

Polyamine analogs of these hydroxy amines, particularly alkoxylated alkylene polyamines (e.g., N,N-(diethanol)-ethylene diamine) may be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the aforementioned primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetra-ethylene pentamine, N-(3-hydroxy butyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

Examples of the N-(hydroxyl-substituted hydrocarbyl) amines include mono-, di-, and triethanolamine, dimethylethanolamine, diethylethanolamine, di-(3-hydroxylpropyl) amine, N-(3-hydroxylbutyl) amine, N-(4-hydroxylbutyl) amine, N,N-di-(2-hydroxylpropyl) amine, N-(2-hydroxylethyl) morpholine and its thio analog, N-(2-hydroxylethyl) cyclohexylamine, N-3-hydroxyl cyclopentyl amine, o-, m- and p-aminophenol, N-(hydroxylethyl) piperazine, N,N'-di(hydroxyl ethyl) piperazine, and the like.

Further hydroxyamines are the hydroxy-substituted primary amines described in U.S. Pat. No. 3,576,743 by the general formula wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a$—$NH_2$ wherein $R_a$ is a mono-O or polyhydroxy-substituted alkyl group. It is desirable that at least one of the hydroxyl groups be a primary alcoholic hydroxyl group. Specific examples of the hydroxy-substituted primary amines include 2-amino-1-butanol; 2-amino-2-methyl-1-propanol; p-(beta-hydroxyethyl)-aniline; 2-amino-1-propanol; 3-amino-1-propanol; 2-amino-2-methyl-1,3-propanediol; 2-amino-2-ethyl-1,3-propanediol; N-(betahydroxypropyl)-N'-(beta-aminoethyl)-piperazine; tris-(hydroxymethyl) aminomethane (also known as trismethylolaminomethane); 2-amino-1-butanol; ethanolamine; beta-(beta-hydroxyethoxy)-ethylamine; glucamine; glusoamine; 4-amino-3-hydroxy-3-methyl-1-butene (which can be prepared according to procedures known in the art by reacting isopreneoxide with ammonia); N-3(aminopropyl)-4-(2-hydroxyethyl)-piperadine; 2-amino-6-methyl-6-heptanol;5-amino-1-pentanol; N-(beta-hydroxyethyl)-1,3-diamino propane; 1,3-diamino-2-hydroxypropane; N-(beta-hydroxy ethoxyethyl)-ethylenediamine; trismethylol aminomethane and the like.

Hydroxyalkyl alkylene polyamines having one or more hydroxyalkyl substituents on the nitrogen atoms, are also useful. Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-(2-hydroxyethyl) ethylenediamine, N,N-bis(2-hydroxyethyl) ethylene diamine, 1-(2-hydroxyethyl)-piperazine, monohydroxypropyl-substituted diethylene triamine, dihydroxypropyl-substituted tetraethylene pentamine, N-(3-hydroxybutyl) tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

3.3 Product of Reacting (A) and (B)

The product of the reaction between components (A) and (B) during step (1) of the inventive process is a first intermediate product. This product may be an ester or a partial ester when component (B) is a polyol. This product may be an amide, imide, salt, amide/salt, partial amide or mixture of two or more thereof when (B) is a polyamine. This product may be an ester, partial ester, amide, partial amide, amide/salt, imide, ester/salt, salt, or a mixture of two or more thereof when component (B) is a hydroxyamine, a mixture of polyol and polyamine, a mixture of polyol and hydroxyamine, or a mixture of polyamine and hydroxyamine. The salt may be an internal salt involving residues of a molecule of the acid or anhydride and the polyamine or hydroxyamine wherein one of the carboxyl groups becomes ionically bound to a nitrogen atom within the same group; or it may be an external salt wherein the ionic salt group is formed with a nitrogen atom that is not part of the same molecule. During step (I), components (A) and (B) are mixed together and heated at an effective temperature to form the foregoing first intermediate product. In one embodiment, the temperature is in the range of from about 30° C. to about 120° C., and in one embodiment from about 50° C. to about 90° C. The reaction time is typically from about 1 to about 120 minutes, and in one embodiment about 1 to about 60 minutes. Components (A) and (B) may be dispersed or dissolved in a normally liquid, substantially inert organic liquid solvent/diluent during the reaction. In one embodiment, components (A) and (B) are reacted in amounts sufficient to provide an equivalent ratio of (A) to (B) from about 3:1 to about 1:2. In one embodiment, this ratio is from about 1:1 to about 1:2, and in one embodiment about 1:1.4 to about 1:1.9.

During step (II) the first intermediate product from step (I) is heated at a sufficient temperature to form a second intermediate product with water of reaction being formed. The temperature may be in the range of about 130° C. to about 210° C., and in one embodiment about 135° C. to about 150° C. The reaction time is typically from about 1 to about 10 hours, and in one embodiment about 1.5 to about 3 hours. When (B) is a polyol, the second intermediate product comprises one or more bisesters, triesters or low order (about 2 to about 6, and in one embodiment about 2 to about 4) oligomers containing ester, or ester and acid functionality. When (B) is a polyamine, the second intermediate product comprises one or more bisamides, bisimides, amide/imide, or low order (about 2 to about 6, and in one embodiment about 2 to about 4) oligomers containing amide, imide, amide/imide, acid and/or salt functionality. When (B) is a hydroxyamine, the second intermediate product comprises one or more bisamides, bisesters, ester/amides or low order (about 2 to about 6, and in one embodiment about 2 to about 4) oligomers containing ester, amide, acid and/or salt functionality. When (B) is a mixture of a polyol, polyamine and/or hydroxyamine, the second intermediate product comprises one or more of the above-mentioned products depending upon which polyol, polyamine and/or hydroxyamine is used. During step (II) a portion of the water of reaction is separated from the second intermediate product using known techniques (e.g., distillation, azeotropic removal of water, molecular sieves, etc.) to provide the desired partially dehydrated product. When component (A) is a succinic anhydride, the amount of water of reaction that is removed is generally from about 0.2 to about 0.9 moles of water per equivalent of succinic anhydride, and in one embodiment about 0.3 to about 0.8 moles of water per equivalent of succinic anhydride, and in one embodiment about 0.4 to about 0.6 moles of water per equivalent of succinic anhydride. When component (A) is a succinic acid, the amount of water of reaction that is removed is generally from about 1.2 to about 1.9 moles of water per equivalent of succinic acid, and in one embodiment about 1.3 to about 1.8 moles of water per equivalent of succinic acid, and in one embodiment about 1.4 to about 1.6 moles of water per equivalent of succinic acid.

3.4 Coemulsifiers

Coemulsifiers may also be used to provide additional control of cell size, cell size distribution, and emulsion stability. Exemplary coemulsifiers include phosphatidyl cholines and phosphatidyl choline-containing compositions, and aliphatic betaines. Also suitable are quaternary ammonium salts comprising at least two long chain $C_{12}$–$C_{22}$ alkyl groups and mono or diester variations of these quaternary ammonium compounds where the ester functionality is disposed between the alkyl group and the nitrogen. A particularly preferred quaternary ammonium salt is hydrogenated ditallow, dimethyl ammonium methyl sulfate. Such coemulsifiers and additional examples are described in greater detail in U.S. Pat. No. 5,650,222, issued in the name of DesMarais, et al. on Jul. 22, 1997, the disclosure of which is incorporated herein by reference.

The coemulsifier can also comprise a sorbitan fatty ester, a diglycerol fatty ester and/or a polyglycerol fatty ester. For example, suitable materials include: sorbitan monolaurate, sorbitan monopalmitate, sorbitan monostearate, sorbitan monoisostearate; diglycerol monolaurate, diglycerol monopalmitate, diglycerol monostearate, diglycerol monoisostearate; polyglycerol monolaurate, polyglycerol monopalmitate, polyglycerol monostearate, polyglycerol monoisostearate; emulsifier compositions comprising a substantial portion of such materials; and the like. An exemplary coemulsifier of this type is sorbitan isostearate which is available from Croda, Inc. of Parsippany, N.J. as Crill 6. A particularly preferred coemulsifier of this type is a polyglycerol isostearate available from Lonza, Inc. of Fair Lawn, N.J. as Polyaldo 2-1-IS. The equivalent compounds containing an fatty ether structure instead of a fatty ester structure are also suitable. Mixtures of any of the above fatty esters and/or fatty ethers are also suitable.

4. Optional Ingredients

Various optional ingredients may also be included in either the aqueous or oil phase for various reasons. Examples include antioxidants (e.g., hindered phenolics, hindered amine light stabilizers, UV absorbers), plasticizers (e.g., dioctyl phthalate, dinonyl sebacate), flame retardants (e.g., halogenated hydrocarbons, phosphates, borates, inorganic salts such as antimony trioxide or ammonium phosphate or magnesium hydroxide), dyes and pigments, fluorescers, filler particles (e.g., starch, titanium dioxide, carbon black, or calcium carbonate), fibers, chain transfer agents, odor absorbers such as activated carbon particulates, dissolved polymers and oliogomers, and such other agents as are commonly added to polymers for a variety of reasons. Such additives may be added to confer color, fluorescent properties, radiation resistance, opacity to radiation (e.g., lead compounds), to disperse charge, to reflect incident infrared light, to absorb radio waves, to form a wettable surface on the HIPE foam struts, or for any other purpose.

B. Processing Conditions for Obtaining HIPE Foams

Foam preparation typically involves the steps of: 1) forming a stable high internal phase emulsion (HIPE); 2) curing this stable emulsion under conditions suitable for forming a cellular polymeric structure; 3) optionally compressing and washing the cellular polymeric structure to remove the original residual aqueous phase from the polymeric foam structure and, if necessary, treating the polymeric foam structure with a hydrophilizing surfactant and/or hydratable salt to deposit any needed hydrophilizing surfactant/hydratable salt, and 4) thereafter dewatering this polymeric foam structure.

1. Formation of HIPE

The HIPE is formed by combining the aqueous and oil phase components in a ratio between about 8:1 and 140:1. Preferably, the ratio is between about 10:1 and about 75:1, more preferably between about 13:1 and about 65:1. As discussed above, the oil phase will typically contain the requisite monomers, comonomers, crosslinkers, emulsifiers, and coemulsifiers, as well as optional components as may be desired. The aqueous phase will typically contain electrolyte or electrolytes and polymerization initiator or initiators.

The HIPE can be formed from the combined oil and aqueous phases by subjecting these combined phases to shear agitation. Shear agitation is generally applied to the extent and for a time period necessary to form a stable emulsion. Such a process can be conducted in either batchwise or continuous fashion and is generally carried out under conditions suitable for forming an emulsion where the aqueous phase droplets are dispersed to such an extent that the resulting polymeric foam will have the requisite structural characteristics. Emulsification of the oil and aqueous phase combination will frequently involve the use of a mixing or agitation device such as an impeller.

One preferred method of forming HIPE involves a continuous process that combines and emulsifies the requisite oil and aqueous phases. In such a process, a liquid stream comprising the oil phase is formed. Concurrently, a separate liquid stream comprising the aqueous phase is also formed. The two separate streams are provided to a suitable mixing chamber or zone at a suitable emulsification pressure and combined therein such that the desired ratio of aqueous phase to oil phase is achieved.

In the mixing chamber or zone, the combined streams are generally subjected to shear agitation provided, for example, by an impeller of suitable configuration and dimensions, or by any other means of imparting shear or turbulent mixing generally known to those skilled in the art. Shear will typically be applied to the combined oil/water phase stream at an appropriate rate and extent. Once formed, the stable liquid HIPE can then be withdrawn or pumped from the mixing chamber or zone. This preferred method for forming HIPEs via a continuous process is described in greater detail in U.S. Pat. No. 5,149,720 (DesMarais, et al), issued Sep. 22, 1992, which is incorporated herein by reference. See also commonly assigned U.S. Pat. No. 5,827,909 (DesMarais) issued on Oct. 27, 1998 (incorporated herein by reference), which describes an improved continuous process having a recirculation loop for the HIPE. The process also allows for the formation of two or more different kinds of HIPEs in the same vessel as disclosed in U.S. Pat. No. 5,817,704 (Shiveley, et al.) issued Oct. 6, 1998, incorporated herein by reference. In this example, two or more pairs of oil and water streams may be independently mixed and then blended as required. Alternatively, in-line mixing techniques as described in U.S. Provisional Patent application Serial No. 60/158,620, filed in the names of Catalfamo, et al. on Oct. 8, 1999 may be used.

2. Polymerization/Curing of the Oil Phase of the HIPE

The HIPE formed will generally be collected or poured into a suitable reaction vessel, container or region to be polymerized or cured. In one embodiment, the reaction vessel comprises a tub constructed of polyethylene from which the eventually polymerized/cured solid foam material can be easily removed for further processing after polymerization/curing has been carried out to the extent desired. It is usually preferred that the temperature at which the HIPE is poured into the vessel be approximately the same as the polymerization/curing temperature.

The emulsifiers of the present invention are also suitable for stabilizing the HIPE during relatively rapid curing at elevated temperatures. Suitable polymerization/curing conditions will vary, depending upon the monomer and other makeup of the oil and water phases of the emulsion (especially the emulsifier systems used), and the type and amounts of polymerization initiators used. Frequently, however, suitable polymerization/curing conditions will involve maintaining the HIPE at elevated temperatures above about 50° C., more preferably above about 65° C., and most preferably above about 80° C., for a time period ranging from about 20 seconds to about 64 hours, more preferably from about 1 minute to about 48 hours. Conditions which can reduce the curing time are discussed in greater detail in U.S. Pat. No. 5,189,070 (Brownscombe et al), issued Feb. 23, 1993 and in U.S. patent application Ser. No. 09/255,225, filed in the name of DesMarais, et al. on Feb. 22, 1999 (the disclosure of each being incorporated herein by reference).

A porous water-filled open-celled HIPE foam is typically obtained after curing the HIPE. This cured HIPE foam may be cut or sliced into a sheet-like form. It has been found that such sheets of cured HIPE foam may be readily processed by subsequent treating/washing and dewatering steps useful for modifying foam properties for end use applications. The cured HIPE foam is typically cut/sliced to provide a cut thickness in the range of from about 0.08 to about 2.5 cm.

3. Treating/Washing HIPE Foam

The solid polymerized HIPE foam formed will generally be filled with residual water phase material used to prepare the HIPE. This residual water phase material (generally an aqueous solution of electrolyte, residual emulsifier, and polymerization initiator) should be at least partially removed prior to further processing and use of the foam. Removal of this original water phase material will usually be carried out by compressing the foam structure to squeeze out residual liquid and/or by washing the foam structure with water or other aqueous washing solutions. Frequently several compressing and washing steps, e.g., from 2 to 4 cycles, will be used.

After the original water phase material has been removed to the extent required, the HIPE foam, if needed, can be treated, e.g., by continued washing, with an aqueous solution of a suitable hydrophilizing surfactant and/or hydratable salt. Hydrophilizing surfactants and hydratable salts that can be employed have been previously described. As noted, treatment of the HIPE foam with the hydrophilizing surfactant/hydratable salt solution continues, if necessary, until the desired amount of hydrophilizing surfactant/ hydratable salt has been incorporated and until the foam exhibits the desired adhesion tension value for any test liquid of choice.

For certain absorbent uses, removal of most of the residual electrolyte (i.e., hydratable salts) from the foam can be desirable. In these circumstances, the level of these residual hydratable salts in the foam is reduced as much as possible during this washing step, typically to about 2% or less, preferably to about 0.5% or less. After the removal of these salts, the HIPE foam will typically require treatment with an effective amount of a suitable hydrophilizing surfactant to rehydrophilize the foam.

4. Foam Dewatering

After the HIPE foam has been treated/washed, it will generally be dewatered. Dewatering can be achieved by compressing the foam (preferably in a direction such that the thinnest dimension is compressed) to squeeze out residual water, by subjecting the foam and the water therein to temperatures of from about 60° to about 200° C., or to microwave treatment, by vacuum dewatering or by a combination of compression and thermal drying/microwave/vacuum dewatering techniques. The dewatering step will generally be carried out until the HIPE foam is ready for use and is as dry as practicable. Frequently such compression dewatered foams will have a water (moisture) content of from about 50 to about 500%, more preferably from about 50 to about 200%, by weight on a dry weight basis. Subsequently, the compressed foams can be thermally dried to a moisture content of from about 5 to about 40%, more preferably from about 5 to about 15%, on a dry weight basis.

Figure 1:
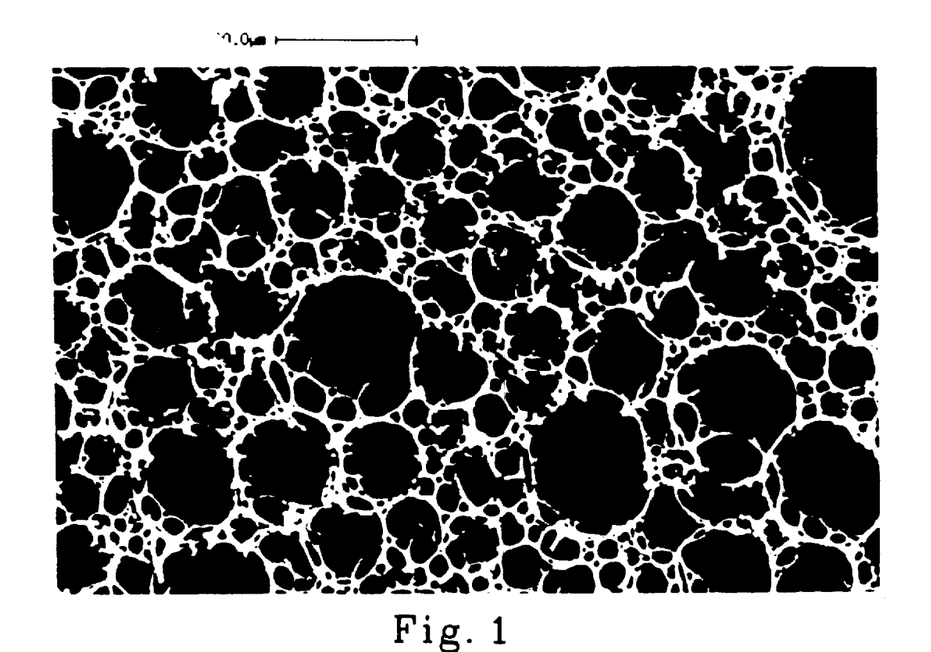
FIG. 1 is an electron photomicrograph at 1000× magnification of a control HIPE foam in its expanded state wherein the emulsion was formed using an oxidatively unstable emulsifier according to the prior art as Sample A of Example 8.
Figure 2:
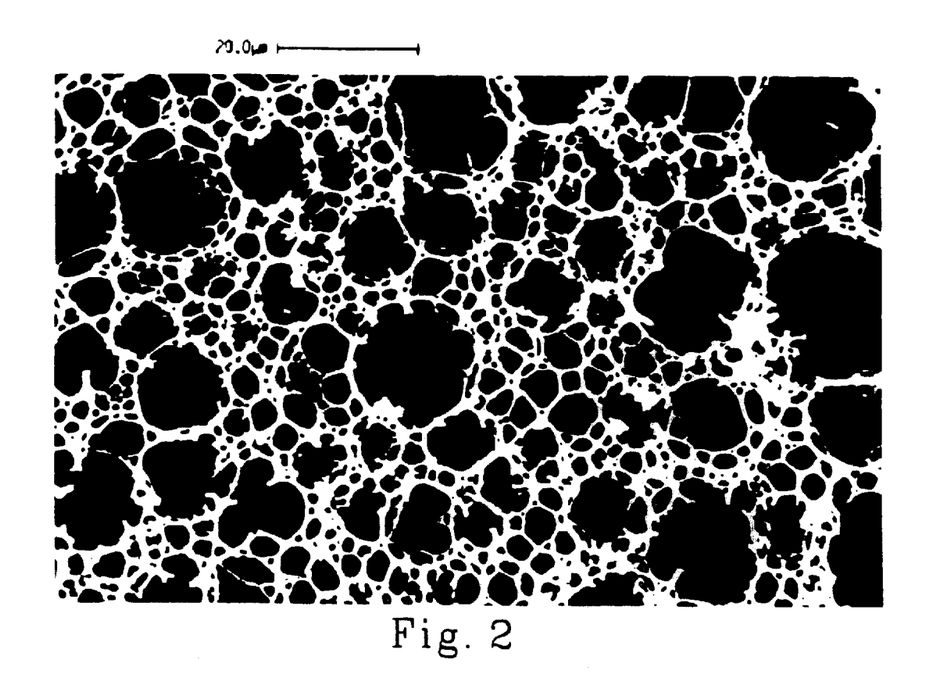
FIG. 2 is an electron photomicrographs at 1000× magnification of a representative polymeric foam in its expanded state according to the present invention prepared as Sample D of Example 8.

FIGS. 1 and 2 are photomicrographs that compare exemplary foams produced according to the prior art and according to the present invention as described in Example 8. Specifically, the foam of FIG. 1 (Sample A of Example 8) was produced according to U.S. Pat. No. 5,756,395 using a diglycerol monooleate emulsifier that is particularly preferred according to the prior art. The foam of FIG. 2 was produced according to Example 8 (Sample D) using an ASD emulsifier according to the present invention. As can clearly be seen, the foams according to the prior art and according to the present invention have substantially the same microscopic appearance. As is also clearly evident from the property data shown in Example 8, an emulsifier according to the present invention provides foams having substantially the same properties (e. g. expansion on contact with aqueous fluids and wicking ability) as foams produced according to the prior art.

III. Test Methods

1. Vertical Hang Sorption Height

Vertical hang sorption height is a measure of the ability of a HIPE foam to wick fluids against gravitational forces. The test methodology for measuring vertical hang sorption height (VHSH) is disclosed in U.S. patent application Ser. No. 09/042,429, filed in the name of DesMarais on Mar. 13, 1998, the disclosure of which is incorporated herein by reference. For purposes of the present invention the value of VHSH at 90% of the zero centimeter capacity is reported.

2. Expansion Factor

Expansion factor is a measure of the ability of a HIPE foam to expand from a collapsed state to an expanded state on exposure to an aqueous fluid. The test methodology for measuring expansion factor is disclosed in U.S. Pat. No. 5,650,222, issued to DesMarais, et al. on Jul. 22, 1997, the disclosure of which is incorporated herein by reference.

3. Total Acid Number

The term "total acid number" (TAN) refers to a measure of the amount of potassium hydroxide (KOH) needed to neutralize all of the acidity of a product or a composition. The sample to be tested is dissolved in a toluene and tert-butyl alcohol solvent and titrated potentiometrically with a solution of tetra-n-butylammonium hydroxide. The toluene and tert-butyl alcohol solvent is prepared by diluting 100 ml of 25% methanolic tert-butyl alcohol and 200 ml of isopropyl alcohol to one liter total volume with toluene. The solution of tetra-n-butylammonium hydroxide is a 25% by weight solution in methyl alcohol. A Metrohm Standard pH Combination Glass Electrode EA 120 (3M aq. KCl), which is a combination glass-plus-reference electrode, is used. The end-points corresponding to the inflections are obtained from the titration curve and the acid numbers calculated.

4. Total Base Number

The term "total base number" (TBN) refers to a measure of the amount of acid (perchloric or hydorchloric) needed to neutralize the basicity of a product or a composition, expressed as KOH equivalents. It may be measured using ASTM standard method D 2896.

5. Total Nitrogen

A modified Kjeldahl nitrogen method as described in ASTM standard method E 258 is suitable.

V. EXAMPLES

Examples 1–7 illustrate methods of preparing various embodiments of alkenyl succinate derivative emulsifiers (ASDs) suitable for use in preparing HIPE foams according to the present invention. Example 8 illustrates preparation of HIPE foams using ASD emulsifiers and the properties of such foams.

Example 1

A five-liter, four-neck flask fitted with a thermocouple, an addition funnel topped with a $N_2$ inlet, a Dean-Stark trap topped with a water condenser, and an overhead stirrer is charged with $C_{18-30}$ alkenyl succinic anhydride (1740.8 g). The contents of the flask are stirred and heated to 64° C. Diethanolamine (590 g) is added via the addition funnel over 35 minutes. The mixture undergoes an exotherm to 105° C. The mixture is heated to 140° C. over 20 minutes and held at that temperature for 2 hours and 40 minutes. Water of reaction (24 g) is removed. The product has a TAN of 53 mg of KOH/g and a TBN of 53.7 mg of KOH/g.

Example 2

A five-liter, four-neck flask fitted with a thermocouple, an addition funnel topped with a $N_2$ inlet, a Dean-Stark trap topped with a water condenser, and an overhead stirrer is charged with $C_{18-30}$ alkenyl succinic anhydride (1715 g). The contents of the flask are stirred and heated to 50° C. Diethanolamine (653 g) is added via the addition funnel over 25 minutes (reaction undergoes an exotherm to 120° C.). The mixture is heated to 140° C. and held at that temperature for 5 hours. Water of reaction (35 g) is removed. The product has a TAN of 37 mg of KOH/g, and a TBN of 57 mg of KOH/g.

Example 3

A five-liter, four-neck flask fitted with a thermocouple, an addition funnel topped with a $N_2$ inlet, a Dean-Stark trap topped with a water condenser, and an overhead stirrer is charged with $C_{18-30}$ alkenyl succinic anhydride (2133 g). The contents of the flask are stirred and heated to 64° C. Glycerol (628 g) is added via the addition funnel over 20–25 minutes. The mixture is heated to 150° C. over 40 minutes.

The temperature of the reaction mixture is increased from 150° C. to 170° C. over a period of 5 hours and maintained at 170° C. for an additional hour. Water of reaction (45 g) is removed. The product has a TAN of 38 mg of KOH/g.

Example 4

A three-liter, four-neck flask fitted with an overhead stirrer, a thermocouple, an addition funnel topped with a $N_2$ inlet, and a Dean-Stark trap topped with a condenser is charged with $C_{18-30}$ alkenyl succinic anhydride (1360.6 g). The contents of the flask are stirred and heated to 63° C. Diethanolamine (406 g) is added via the addition funnel over 27 minutes. During the addition, the reaction mixture undergoes an exotherm to 114° C. The temperature is increased to 140° C. over 15 minutes by external heating, and maintained at that temperature for 45 minutes. Water of reaction (18 g) is removed. The mixture is cooled to room temperature. The TAN of the final product is 60.7 mg of KOH/g.

Example 5

A two-liter, four-neck flask equipped with a stopcock drain, an overhead stirrer, a thermocouple, an addition funnel topped with a $N_2$ inlet, and a Dean-Stark trap topped with a water condenser, is charged with $C_{18-30}$ alkenyl succinic anhydride (1050.3 g). The contents of the flask are heated to 60° C. Triethanolamine (158.7 g) and glycerol (293.9 g) are added sequentially over a 30-minute period. During the triethanolamine addition, the reaction mixture undergoes an exotherm to 90° C. Upon completion of glycerol addition, the reaction, mixture is stirred and heated to 140° C., and maintained at that temperature for 5 hours to provide the final product which is in the form is a viscous brown liquid. Water of reaction (25 g) is removed. The product has a TAN of 29.3 mg of KOH/g, a TBN of 39.8 mg of KOH/g, and a nitrogen content of 0.98% by weight.

Example 6

A one-liter, four-neck flask fitted with a thermocouple, an addition funnel topped with a $N_2$ inlet, a Dean-Stark trap topped with a water condenser, and an overhead stirrer is charged with $C_{18-30}$ alkenyl succinic anhydride (251.4 g) and a mixture of $C_{16}$–$C_{18}$ alpha olefins (140.3 g). The contents of the flask are stirred and heated to 90° C. A polyamine bottoms product corresponding predominately to tetraethylene pentamine (29.6 g), is added dropwise via the addition funnel. The mixture undergoes an exotherm to 110° C. The mixture is maintained at 100° C. for 3.5 hours. Water of reaction (3.15 g) is removed. The product has a TAN of 49.7 mg of KOH/g.

Example 7

A one-liter, four-neck flask fitted with a thermocouple, an addition funnel topped with a $N_2$ inlet, a Dean-Stark trap topped with a water condenser, and an overhead stirrer is charged with $C_{18-30}$ alkenyl succinic anhydride (315.6 g) and a mixture of $C_{16}$–$C_{18}$ alpha olefins (167.0 g). Th contents of the flask are stirred and heated to 90° C. A polyamine bottoms product corresponding predominately to tetraethylene pentamine (30 g) is added via the addition funnel over 10 minutes. The mixture undergoes an exotherm to 120° C. The mixture is maintained at 100° C. with stirring for 3.5 hours. Water of reaction (4.0 g) is removed. The product has a TAN of 55.4 mg of KOH/g.

Example 8

A one-liter, four-neck flask fitted with a thermocouple, a nitrogen inlet needle, a Dean-Stark trap topped with a water condenser, and an overhead stirrer is charged with $C_{18-30}$ alkenyl succinic anhydride (203.8 g), commercial triglycerol (140 g) and glycerol (54.3 g). The contents of the flask are stirred and heated to 160° C. for six hours while they are bubbled with nitrogen. The mixture is cooled to room temperature. The product has a TAN of 20.8 mg of KOH/g.

Example 9

Preparation of Foam from a HIPE Prepared Using an ASD Emulsifier A) HIPE Preparation An aqueous solution containing 4% calcium chloride and 0.05% potassium persulfate is prepared by dissolving the appropriate quantity of salts in a suitable volume of water. For example, anhydrous calcium chloride (3.5 kg) and potassium persulfate (43.7 g) are dissolved in 83.4 L of water. This provides the water phase stream to be used in a continuous process for forming the HIPE.

The oil phase is prepared by mixing appropriate quantities of the monomers, emulsifier(s), and/or other oil phase components. For example, suitable oil phases are prepared by mixing the components listed in Table 1 below.

Samples designated A and B serve as control materials utilizing diglycerol monooleate as the primary emulsifier, as desribed in U.S. Pat. No. 5,786,395. Samples designated B and C. are made according to the present invention and utilize oxidatively stable emulsifiers. On aging, foams A and B made using the prior art emulsifier developed a characteristic, rancid odor compared to the foam made using the emulsifier of the present invention.

TABLE 1

| Oil Phase Component | A | B | C | D |
|---|---|---|---|---|
| 2-ethylhexyl acrylate (EHA) | 1650 g | 1650 g | 1650 g | 1650 g |
| Divinylbenzene (42% purity)* (DVB-42) | 990 g | 990 g | 990 g | 990 g |
| 1,6-hexanediol diacrylate (HDDA) | 360 g | 360 g | 360 g | 360 g |
| Diglycerol monooleate (DGMO) | 240 g | 180 g | — | — |
| Alkenyl succinate derivative (ASD) | — | — | 180 g | 240 g |
| Polyglycerol isostearyl ester (PIE) | — | — | 60 g | — |
| Ditallow dimethyl ammonium (DTDMAMS) methyl sulfate | 30 g | 30 g | 30 g | 30 g |
| Tinuvin-765 (T-765) | 9 g | — | — | — |

*The remainder is ethyl styrene

EHA and HDDA are obtained from Aldrich Chemical Co., Milwaukee, Wis.
DVB-42 is obtained from Dow Chemical, Midland, Mich.
Diglycerol monooleate (DGMO) may be prepared following the general proceedure for preparing polyglycerol esters described in Example 1 of the aforementioned U.S. Pat. No. 5,786,395.
ASD emulsifiers may be obtained from Lubrizol Corp., Wickliffe, Ohio.
PIE is obtained form Lonza Corp., Fair Lawn, N.J. as Polyaldo 2-1-IS.
DTDMAMS is obtained from Witco Corp., Greenwich, Conn.
T-765 is obtained from Ciba Specialty Chemicals Corp., High Point, N.C.
Separate streams of the oil phase (25° C.) and water phase (65° C.) are fed to a dynamic mixing apparatus, as described in Example 1 of U.S. Pat. No. 5,827,909. The flow rates, impeller speed, and recirculation rate are adjusted to achieve a stable HIPE with a ratio of oil-phase to water-phase of 45:1. Process conditions for each sample are listed in Table 2 below.

TABLE 2

|  |  | A | B | C | D |
| --- | --- | --- | --- | --- | --- |
| Flow Rate | lb/min | 6.1 | 6.0 | 6.1 | 6.1 |
| Recirculation Rate | lb/min | 3.0 | 1.5 | 1.5 | 1.5 |
| W:O Ratio |  | 45:1 | 45:1 | 45:1 | 45:1 |
| Impeller Speed | RPM | 1800 | 1800 | 1800 | 1800 |
| Pour Temperature | °C. | 67 | 69 | 76 | 66 |

B) Polymerization/Curing of HIPE

The HIPE flowing from the dynamic mixing zone that is not recirculated is collected in a round polypropylene tub, 17 in. (43 cm) in diameter and 7.5 in (10 cm) high, with a concentric insert made of Celcon plastic. The insert is 5 in (12.7 cm) in diameter at its base and 4.75 in (12 cm) in diameter at its top and is 6.75 in (17.1 cm) high. The HIPE-containing tubs are kept in a room maintained at 65° C. for 16 hours to bring about polymerization and crosslinking of the monomers in order to form the foam.

C) Foam Washing and Dewatering

The cured HIPE foam is removed from the curing tubs. The foam at this point has residual water phase (containing dissolved emulsifiers, electrolyte, initiator residues, and initiator) about 14 times the weight of polymerized monomers. The foam is sliced with a sharp reciprocating saw blade into sheets which are 0.078 inches (2 mm) in thickness. These sheets are then subjected to compression by a porous nip roll equipped with vacuum which reduce the residual water phase content of the foam to about 5 times (5×) the weight of the polymerized material. At this point, the sheets are then resaturated with a water at 60° C., and then run through a porous nip roll equipped with vacuum to a water phase content of about 2×. The $CaCl_2$ content of the foam is less than about 2%.

For samples designated A and D in the tables above, the foam is then resaturated with a solution comprising a nonionic emulsifier (Pegosperse 200 ML as is available from Lonza, Inc. of Fair lawn, N.J.) at 0.25% and 0.5% $CaCl_2$. The resaturated web is run through a series of 3 porous nip rolls which reduces the water content to about 1×. It is believed that the nonionic emulsifier partitions to the polymeric foam increasing the wettability thereof.

All of the foam samples are then dried in air for about 16 hours. Such drying reduces the moisture content to less than about 5% by weight of polymerized material.

Table 3 presents characterization data for samples A–D.

TABLE 3

|  | A | B | C | D |
| --- | --- | --- | --- | --- |
| Vertical Hang Sorption Height cm | 65.8 | 70.4 | 62.8 | 61.6 |
| Expansion Factor | 3.0 | 1.5 | 1.5 | 1.5 |

The foams produced in these examples are open-celled and sufficiently cured in the time noted to have useful properties. Each can be post-treated to be either hydrophilic or hydrophobic, depending on the intended use. The formulations may be altered in each parameter to modify the properties such as Tg (changing the level of a Tg lowering monomer), cell size (decrease by increasing shear or RPM), density (decrease by changing W:O ratio), toughness (increase by adding styrene), and the like.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

What is claimed is:

1. A polymeric foam material prepared by polymerizing and crosslinking a high internal phase emulsion, the emulsion comprising:
    1) an oil phase comprising:
        a) from about 80 to about 99% by weight of a monomer component capable of forming a copolymer having a Tg value of below about 90° C. or lower, the monomer component comprising:
            i) from about 5 to about 80% by weight of a substantially water-insoluble, monofunctional monomer capable of forming a polymer having a Tg of about 35° C. or less;
            ii) from about 0 to about 70% by weight of a substantially water-insoluble, monofunctional comonomer capable of imparting other desired properties to the foam;
            iii) from about 5 to about 80% by weight of a substantially water-insoluble, polyfunctional crosslinking agent; and
        b) from about 1 to about 20% by weight of an ASD emulsifier which is soluble in the oil phase, said emulsifier being characterized as comprising the partially dehydrated reaction product of:
            i) at least one hydrocarbyl substituted succinic acid or anhydride (A) or a reactive equivalent thereof, the hydrocarbyl substituent of said succinic acid or anhydride having an average of from about 8 to about 100 carbon atoms; and
            ii) at least one coreactant selected from the group consisting of polyols, polyamines, hydroxyamines or mixtures of two or more thereof;
            wherein said hydrocarbyl substituted succinic acid or anhydride (A) and said coreactant (B) are reacted under conditions so as to cause said reaction product to be partially dehydrated so as to separate water of reaction such that, when (A) is succinic anhydride, from about 0.2 to about 0.9 moles of said water of reaction per equivalent of said succinic anhydride are removed by said partial dehydration, when (A) is said succinic acid the amount of water of reaction that is removed by said partial dehydration is from about 1.2 to about 1.9 moles of said water of reaction per equivalent of said succinic acid, said partially dehydrated product having a total acid number in the range of about 10 to about 100 mg of KOH/g; and
    2) an aqueous phase comprising a water solution containing: (a) from about 0.2 to about 40% by weight of a water-soluble electrolyte; and (b) an effective amount of a polymerization initiator;
wherein the emulsion has a volume to weight ratio of aqueous phase to oil phase in the range of from about 8:1 to about 140:1.

2. The polymeric foam material of claim 1 wherein:
    1) the oil phase comprises:
        a) from about 90 to about 97% by weight of a monomer component capable of forming a copolymer having a Tg value from about 15° to about 50° C., the monomer component comprising:
  i) from about 20 to about 90% by weight monomer selected from the group consisting of $C_4$–$C_{14}$ alkyl acrylates, aryl acrylates, $C_6$–$C_{16}$ alkyl methacrylates, dienes, $C_4$–$C_{12}$ alkyl styrenes and mixtures thereof;
  ii) from about 0 to about 40% by weight comonomer selected from the group consisting of styrene, ethyl styrene, methyl methacrylate, and mixtures thereof;
  iii) from about 5 to about 40% by weight of a substantially water-insoluble polyfunctional crosslinker selected from the group consisting of 1,6-hexanedioldiacrylate, 1,4-butanediolacrylate, 1,4-butanedioldimethacrylate, trimethylolpropane triacrylate, trimethylolpropane trimethacrylate, 1,12-dodecanedioldimethacrylate, ethylene glycol dimethacrylate, ethylene glycol diacrylate, neopentyl glycol dimethacrylate, glucose pentaacrylate, sorbitan pentaacrylate, ethylene glycol acrylate methacrylate, hexanediol acrylate methacrylate, and neopentyl glycol acrylate methacrylate, divinyl benzene, divinyl naphthalene, trivinyl benzene, divinyl alkyl benzenes, divinyl biphenyls, divinyl phenyl ethers, divinyl ferrocenes, divinyl furans, hexamethylene bisacrylamide, and mixtures thereof; and
  b) from about 3 to about 10% by weight of the emulsifier component; and
  2) the aqueous phase comprises from about 1 to about 40% calcium chloride.

3. The polymeric foam material of claim 2 wherein monomer (i) is selected from the group consisting of butyl acrylate, hexyl acrylate, octyl acrylate, 2-ethylhexyl acrylate, nonyl acrylate, decyl acrylate, dodecyl acrylate, isodecyl acrylate, tetradecyl acrylate, benzyl acrylate, nonylphenyl acrylate, hexyl methacrylate, octyl methacrylate, nonyl methacrylate, decyl methacrylate, isodecyl methacrylate, dodecyl methacrylate, tetradecyl methacrylate, N-octadecyl acrylamide, p-n-octylstyrene, isoprene, butadiene, piperylene, chloroprene, β-myrcene, and mixtures thereof.

4. The polymeric foam material of claim 2 wherein the volume to weight ratio of aqueous phase to oil phase is in the range of from about 10:1 to about 75:1.

5. The polymeric foam material claim 4 wherein the volume to weight ratio of water phase to oil phase is in the range of from about 13:1 to about 65:1.

6. The polymeric foam material of claim 1 wherein said coreactant is selected from the group consisting of polyols, polyamines, hydroxyamines or mixtures of two or more thereof.

7. The polymeric foam material of claim 6 wherein said coreactant is a hydroxyamine.

8. The polymeric foam material of claim 7 wherein said hydroxyamine is selected from the group consisting of monoethanolamine, diethanolamine, triethanolamine, 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propanediol, 2-amino-2-ethyl-1,3-propanediol, and mixtures of two or more thereof.

9. The polymeric foam material of claim 6 wherein said coreactant is a polyamine.

10. The polymeric foam material of claim 9 wherein said polyyamine is selected from the group consisting of ethylene diamine, triethylene tetramine, tris-(2-aminoethyl)amine, propylene diamine, trimethylene diamine, tripropylene tetramine, tetraethylene pentamine, hexaethylene heptamine, pentaethylene hexamine, and mixtures of two or more thereof.

11. The polymeric foam material of claim 6 wherein said coreactant is a polyol.

12. The polymeric foam material of claim 11 wherein said polyol is an oligomer of glycerol or combinations of oligomers of glycerol.

13. The polymeric foam material of claim 1 wherein the oil phase further comprises one or more coemulsifiers selected from the group consisting of sorbitan fatty esters; diglycerol fatty esters; polyglycerol fatty esters; sorbitan fatty ethers; diglycerol fatty ethers; polyglycerol fatty ethers, phosphatidyl cholines, phosphatidyl choline-containing compositions, aliphatic betaines, quaternary ammonium salts comprising at least two long chain $C_{12}$–$C_{22}$ alkyl groups, quaternary ammonium salts comprising at least two ester substituted long chain $C_{12}$–$C_{22}$ alkyl groups where the ester functionality is disposed between the alkyl group and the nitrogen, quaternary ammonium salts comprising at least two ether substituted long chain $C_{12}$–$C_{22}$ alkyl groups where the ether functionality is disposed between the alkyl group and the nitrogen, and mixtures thereof.

14. The polymeric foam material of claim 13 wherein the coemulsifier comprises ditallow, dimethyl ammonium methyl sulfate.

15. The polymeric foam material of claim 9 wherein the coemulsifier comprises sorbitan isostearate.

16. The polymeric foam material of claim 13 wherein said coemulsifier comprises polyglycerol isostearate.

* * * * *

UNITED STATES PATENT AND TRADEMARK OFFICE
CERTIFICATE OF CORRECTION

PATENT NO. : 6,444,716 B1  Page 1 of 1
DATED : September 3, 2002
INVENTOR(S) : Hird et al.

It is certified that error appears in the above-identified patent and that said Letters Patent is hereby corrected as shown below:

Column 7,
Line 16, "fHPEs" should read -- HIPEs --.

Column 9,
Line 6, "Al" should read -- AI --.

Column 19,
Line 56, "Th" should read -- The --.

Signed and Sealed this

Eighteenth Day of February, 2003

JAMES E. ROGAN
*Director of the United States Patent and Trademark Office*